United States Patent [19]

Tucci et al.

[11] 4,320,010

[45] Mar. 16, 1982

[54] REGENERATION DETECTOR FOR WATER SOFTENERS

[75] Inventors: Mario A. Tucci, St. Paul; George K. Sutherland, White Bear Lake, both of Minn.

[73] Assignee: Sys-Tec, Inc., New Brighton, Minn.

[21] Appl. No.: 173,988

[22] Filed: Jul. 31, 1980

Related U.S. Application Data

[63] Continuation of Ser. No. 114,848, Jan. 24, 1980, abandoned, which is a continuation of Ser. No. 23,635, Mar. 26, 1979, abandoned.

[51] Int. Cl.³ .......................................... B01D 41/02
[52] U.S. Cl. ................................. 210/662; 210/96.1; 525/334
[58] Field of Search .................... 210/662, 96.1, 102, 210/103, 190, 191, 269, 279, 277, 278, 288; 324/30; 521/26

[56] References Cited

U.S. PATENT DOCUMENTS

| | | |
|---|---|---|
| 1,652,710 | 12/1927 | Dotterweich . |
| 2,351,648 | 6/1944 | Whitlock .................... 210/24 |
| 3,172,037 | 3/1965 | Pfeiffer ........................ 324/30 |
| 3,215,273 | 11/1965 | Kryzer ..................... 210/191 X |
| 3,246,759 | 4/1966 | Matalon ..................... 210/96 |
| 3,334,044 | 8/1967 | Satterlee ..................... 210/25 |
| 3,342,338 | 9/1967 | Selmeczi ................... 210/191 |
| 3,366,241 | 1/1968 | McMorris ................. 210/190 |
| 3,383,310 | 5/1968 | Ammer ...................... 210/190 |
| 3,618,769 | 11/1971 | Iglesias ........................ 210/85 |
| 3,703,457 | 11/1972 | Niedrach et al. ........... 204/195 P |
| 3,838,774 | 10/1974 | Dolan et al. ................. 210/85 |
| 3,869,382 | 3/1975 | Tejeda ........................ 210/30 |

FOREIGN PATENT DOCUMENTS

| | | | |
|---|---|---|---|
| 667503 | 6/1979 | U.S.S.R. | ................ 71/40 |
| 700515 | 11/1979 | U.S.S.R. | ................ 71/40 |
| 715559 | 2/1980 | U.S.S.R. | ................ 71/40 |

*Primary Examiner*—S. Leon Bashore
*Assistant Examiner*—F. H. Lander
*Attorney, Agent, or Firm*—Orrin M. Haugen; Thomas J. Nikolai

[57] ABSTRACT

A method and apparatus for initiating the regeneration cycle of an ion exchange resin type water softener based upon the movement of the "hardness front" through the resin bed as water being treated is passed therethrough. Electrical probes are provided at predetermined longitudinally spaced locations and the difference in potential between the probes is measured, as is the rate of change of this potential with respect to time. It is found that as the hardness front passes between the probes, a detectable change in potential occurs which may be applied to an electronic circuit for generating a control signal which may initiate the regeneration cycle of the water softener subsequent to the arrival of the hardness front in the zone between the probes.

8 Claims, 5 Drawing Figures

REGENERATION DETECTOR FOR WATER SOFTENERS

CROSS-REFERENCE TO RELATED APPLICATIONS

This application is a continuation-in-part of application Ser. No. 114,848, filed Jan. 24, 1980, now abandoned, which application was a continuation of Ser. No. 023,635, filed Mar. 26, 1979 (now abandoned) for "Regeneration Detector for Water Softeners".

BACKGROUND OF THE INVENTION

I. Field of the Invention

This invention relates generally to water treatment apparatus, and more specifically to a new and improved method and apparatus for indicating the need for regeneration of the ion exchange resin bed of a water softener.

II. Discussion of the Prior Art

In most present day residential and commercial water softening installations, regeneration is made to occur based upon elapsed time only and independent from the volume of water treated. In such conventional systems, an electromechanical timer mechanism is set to initiate the regeneration cycle at fixed times during each week, irrespective of the particular water demand during the period between successive regeneration cycles. It is, of course, wasteful of both water and brine solution to regenerate the ion exchange bed when that bed is not substantially exhausted. For example, in the event that a homeowner forgets to turn off the timer unit when departing on a vacation trip, the softener unit may repeatedly go through its regeneration cycle even though the ion exchange resin bed is fully active.

A more preferable way of initiating the regeneration cycle is to measure the condition of the bed and only initiate regeneration when the bed is close to being fully exhausted. Various approaches have been described in the prior art for achieving this result. Typically, means are provided in the ion exchange bed for sensing the change in conductivity between two test probes. When a voltage is impressed across the test probes, the amplitude of the current flowing is related to the condition of the bed. A relatively high current flow is established in the presence of sodium ions in the resin, whereas, as the sodium ions are replaced with magnesium and calcium ions, the conductivity of the resin bed decreases and the current flow is accordingly reduced. Such an approach has not been altogether successful in that the electrode probes tend to become contaminated with iron deposits or the like over a period of use which causes the system control point to drift erratically and adversely affects the ability to get accurate readings of the conductivity factor of the bed. Then too, municipalities periodically introduce different chemicals into the water system which affects the conductivity of the electrolyte existing between the sensing probes. As such, it is difficult to provide an electronic control circuit for monitoring the conductivity and providing a reliable signal which indicates that depletion is imminent and that regeneration should take place. Because the conductivity sensing approach involves the application of an external voltage across an electrode gap, electrolysis takes place leading to the generation of hydrogen gas which could be undesirable. A further drawback of such a conductivity sensing approach is that immediately re-triggering of the regeneration system can occur due to the presence of hard water in the tank left by the rinse cycle. The problem is especially acute where the high volume rinse operation results in channeling of hard water in the center or core of the resin bed. Repeated triggering is, of course, to be avoided because it is unnecessary and wasteful of both brine and water.

In the Tejeda U.S. Pat. No. 3,869,382 there is described a technique in which the exhaustion of the resin exchange bed is determined by measuring an internally generated potential which undergoes a sharp change as exhaustion is approached. That is, if a pair of electrodes is located in the flow path at positions spaced in the direction of flow with at least a portion of the ion exchange resin material interposed between the electrodes, a potential is electrochemically generated so long as the water is flowing. This potential is present between the electrodes and it experiences a rather marked change in level when the portion of the column between the electrodes changes from its active state to its exhausted state. The change in potential is periodically manually sensed while the water is flowing and used to indicate the need to initiate the manual regeneration cycle.

The method and apparatus of the Tejeda '382 Patent also may not be used in a building's central water softening system or a residential system, but is limited to the use on individual faucets in that building as disclosed. The reason for this is that in practical residential, commercial and industrial installations, existing electrical codes typically require that the inlet pipes and the outlet pipes of the system be electrically bussed together to provide a continuous earth ground, since the plumbing is often used as an electrical earth return to ground potential. Because the water softening tank is usually fabricated from a fiberglass reinforced plastic material or the like (an insulator), electrical codes require that a conductive strap be connected between the water inlet pipe to the softener tank and the water outlet pipe leading to the building's supply mains. Under these conditions, with no water flow, the internally generated potential observed in the Tejeda system is reduced to the point where the potential cannot reliably indicate the need for regeneration.

The present invention makes use of some of the principles set forth in the above-referenced Tejeda Patent but is considered to be an improvement thereover in that not only is the change in potential between the electrodes continuously monitored, but so is the rate of change of that potential with respect to time. Thus, even when the flow of water through the ion exchange bed is intermittent, the passage of the hardness front to a location intermediate the spaced apart electrodes will be detected. Were it not for the sensing of the rate of change of potential, it is conceivable that an intermittent usage of water in the building could result in the travel of the hardness front through the interelectrode zone without producing a sufficiently high potential to be detected by the external sensing circuitry. As such, a system using only the approach described in the Tejeda Patent could result in complete exhaustion of the bed without the desired initiation of a regeneration cycle.

SUMMARY OF THE INVENTION

In accordance with the present invention, there is provided a method and apparatus for reliably indicating the need for regeneration of an ion exchange bed used in water treatment apparatus. In carrying out the invention, at least two electrical probes are disposed in the tank containing an ion exchange resin bed, the electrodes or probes being spaced apart from one another in the direction of flow of the water to be treated through the bed. These probes are generally identical, being formed from identical materials and are connected to an electronic sensing circuit which is capable of comparing the potential difference appearing across these probes with a predetermined reference value. In a continuous flow situation, it will be noted that as the hardness front passes between the selected probes, a marked change in the voltage across them will be noted and when this change exceeds a predetermined threshold, the control circuit develops a signal which may be applied to a utilization device to perform a subsequent function such as triggering the regeneration cycle. It is found, however, that if the water usage or flow is intermittent, the difference in potential between the selected electrodes may never reach the aforementioned predetermined threshold value as the hardness front passes into the zone between the selected electrodes. To obviate this problem, the control circuit of the present invention not only monitors the absolute change in potential, but also the rate at which the potential difference is changing with respect to time. As will be explained more fully hereinbelow, if the water supply is turned on and off, intermittently, as the hardness front moves into the zone between the spaced apart electrodes, the rate of change of potential is substantially higher than that observed under steady flow conditions or when the hardness front is outside of that zone. By monitoring the rate of change of potential with respect to time, it is possible to ensure that the hardness front does not pass completely through the zone during intermittent usage of the water supply.

In certain prior art arrangements, at least two dissimilar electrodes are inserted into a solution containing a concentration of ions of a given type whereby the detected voltage between the electrodes is a function of the concentration of free ions in the solution. Typically, one of the electrodes may be used to determine the concentration of alkali metal ions in the water softening apparatus, an abundance of Na+ ions indicating soft water and a relative deficiency of such ions indicating hard water.

As mentioned above, in an ion exchange vessel (water softener), there exists a relatively well defined boundary zone where the ion exchange takes place. This boundary exchange zone travels from the water inlet to the water outlet as the resin bed in the exchange vessel becomes exhausted and in need of regeneration. If an electrode is placed in the vessel in the exhausted side of the exchange zone, and another identical (non-dissimilar) electrode is placed in the soft water side of the exchange zone, a voltage can be detected between the two electrodes that is indicative of the rate of ion exchange taking place. The system of the present invention uses this latter phenomena rather than measuring relative concentration of sodium ions in the water by attracting alkali ions to one of two dissimilar electrodes having an affinity thereto and using the other as a reference emf. Further, in accordance with the present invention, all of the electrodes employed in the system are substantially identical, being formed from the same metal or class of materials. As such, it is the rate of exchange of ions taking place in the ion exchange zone as it moves past the electrode site as water is being drawn from the system that generates the potential difference used for effecting control of the regeneration cycle.

In prior art arrangements using dissimilar electrodes immersed in an electrolyte for measuring the concentration of free ions of a given type therein, one of the electrodes will preferentially accept alkali ions and will tend to become fouled through a plating process with minerals such that frequent disassembly and cleaning is required. The system of the present invention overcomes this deficiency of the prior art. That is to say, because the present invention involves the use of non-dissimilar electrodes, there is no preferential acceptance of ions by the electrodes and, accordingly, the plating on of contaminants does not take place.

In its simplest form, the sensing circuit of the present invention comprises an input stage having an extremely high input impedance so that the sensing circuitry does not load down the cell comprised of the spaced apart metal electrodes and the resin therebetween nor does a sufficient current flow to poison the probes by plating. The output from this first stage is continuously compared in magnitude to a predetermined threshold and if that threshold is exceeded, a control signal is generated which may be applied to a utilization device to perform a desired function. Furthermore, the output from the first stage is applied to an active differentiating circuit whose output is, in turn, coupled to a first input of a second comparator. Thus when the voltage output from the differentiating circuit exceeds a predetermined threshold, this second comparator circuit outputs a control signal for the utilization device.

OBJECTS

It is accordingly a principal object of the present invention to provide a new and improved method and apparatus for automatically initiating the regeneration cycle in an ion exchange resin type water softener.

Another object of the invention is to provide a system of the type described wherein the regeneration occurs as a function of water usage rather than at fixed time intervals.

Yet another object of the invention is to provide a system wherein an internally generated potential difference is monitored across a pair of probes comprised of similar metals and wherein regeneration is initiated when the absolute value of the potential difference exceeds a first threshold or when the rate of change of that potential with respect to time exceeds a predetermined threshold.

These and other objects and advantages of the invention will become apparent to those skilled in the art from the following detailed description of the preferred embodiment when considered in light of the accompanying drawings.

DESCRIPTION OF THE PREFERRED EMBODIMENT

Figure 1:
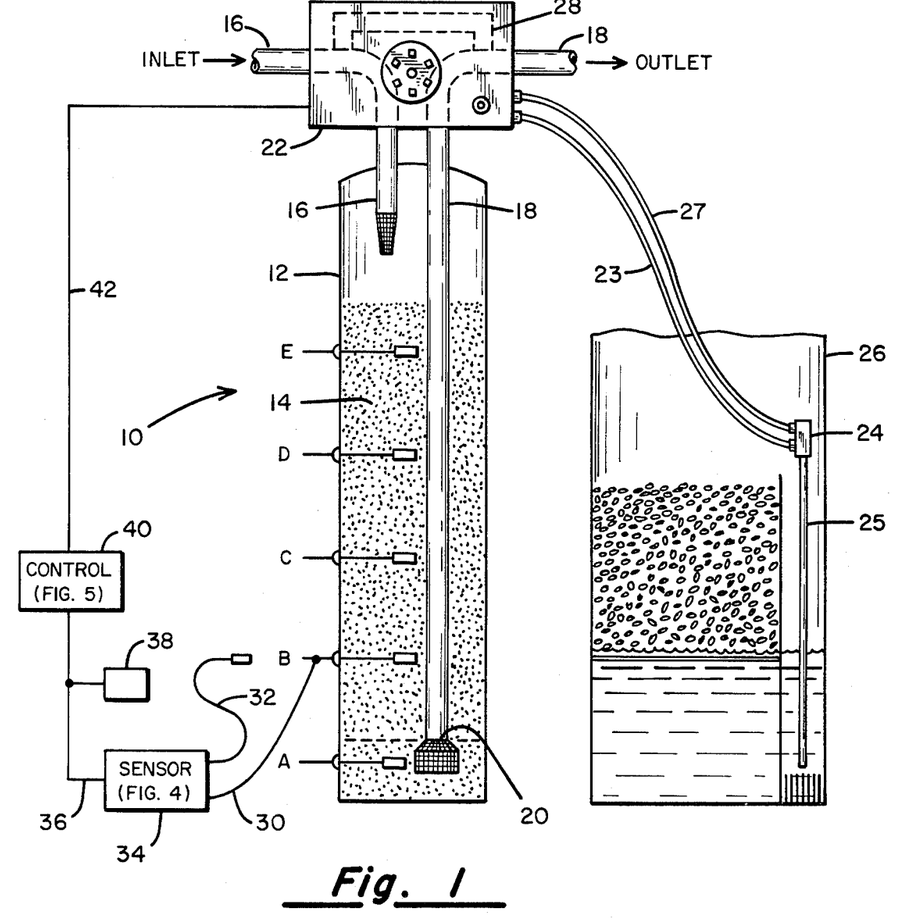
FIG. 1 is an electrical and mechanical schematic drawing of a preferred embodiment.

Referring first to FIG. 1, there is indicated generally by numeral 10 a water softening system comprising an elongated hollow tank 12 containing a suitable ion exchange resin bed 14. Associated with the tank 12 is an inlet pipe 16 for introducing hard water to be treated under pressure into the tank. An outlet pipe 18 is further provided having its inlet end 20 disposed proximate the bottom of the tank 12 so as to receive the treated water after it has passed through the resin bed 14.

Generally speaking, when the regeneration cycle for an automatic water softener is initiated, programmed sequence of events takes place under control of a timer mechanism. First, a valve (not shown) is operated which allows water to flow from the main valve of the softener, through a hose connection 23 to a venturi nozzle 24. The flow of water through the venturi nozzle operates in the usual fashion to create a partial vacuum enabling the brine valve 25 to draw brine from the bottom section of a storage tank 26 containing common salt pellets or the like and to inject it through hose connection 27 into the resin bed. As the mixture of brine and water flows through the resin bed, ion exchange takes place wherein the hardness ions linked to the resin beads are replaced with sodium ions. While this regeneration process is taking place, an automatic hard water by-pass 28 in the main valve allows untreated water to be available to the user.

When a predetermined amount of brine has been injected into the resin bed, the brine flow will cease and only water will continue to flow for the remainder of the cycle. This latter portion of the flow is called the "slow rinse cycle". Following the end of this slow rinse cycle, another valve is actuated and a "backwash cycle" is initiated. Water now flows in the reverse direction of normal flow for a predetermined length of time. Following the backwash cycle, another valve is actuated, causing water to flow downward at a rather fast rate to flush away any salt or foreign matter from the resin bed. Following the fast rinse cycle another valve is actuated, causing the system to return to the normal service cycle. At this time, the automatic hard water by-pass is also closed, preventing any untreated water from mixing with the treated water going to the user's mains.

The number of cycles, the direction of flow of water through the tank during the cycles and the sequence of the cycles may differ from manufacturer to manufacturer so that it is to be understood that the foregoing description of the complete regeneration cycle is considered to be typical and is included principally for background understanding of the present invention.

As indicated in the introductory portion of this specification, in prior art water softening systems, it has been a widely used practice to initiate the above-described regeneration cycle strictly as a function of time. That is, perhaps three or four times per week, a motor driven clock mechanism operates to initiate the regeneration cycle. The frequency of regeneration can generally be set and is based upon the water usage and water hardness in the application in question. Because water demand varies considerably, this prior art approach is wasteful of both water and salt. Frequently, the regeneration cycle is initiated before the ion exchange resin bed 14 is completely exhausted. It is a purpose of the present invention to provide a means whereby the regeneration cycle is initiated not as a function of time, but instead, upon a detection of the fact that the resin bed 14 is nearing its exhaustion point.

To achieve this end, there is provided in the tank 12 at least two electrodes which may be disposed on one or more probes. For the purpose of illustration only, the tank 12 of FIG. 1 is shown to include a plurality of substantially identical electrode probes labeled A–E which extend through the side wall of the tank 12. It should be understood, however, that the electrodes may be disposed in a spaced part relationship along the length of a single probe which may enter through the top of the tank so as to project into the resin bed to a predetermined depth. It is to be further understood that the terms "top" and "bottom" as used herein are only with reference to the drawing of FIG. 1 and that it is to be recognized that the tank 12 may be disposed in a horizontal orientation and need not necessarily be positioned vertically in the fashion illustrated.

Each of the probes A through E is fabricated from essentially identical material, such as stainless steel or the like, it being noted that other materials may be suitably employed for this purpose as well. The utilization of identical electrodes (non-dissimilar materials) provides a significant advantage in the overall operation of the system. Specifically, this arrangement provides for the elimination of any possibility of destructive electrolysis which may, under certain circumstances, contaminate a water supply through the addition of metallic ions thereto. Furthermore, the surfaces of the electrodes remain free of coatings which may, under certain circumstances, develop through plating within the system when dissimilar electrodes are employed such that an affinity exists between the free ions within the electrolyte and one of the electrodes.

The probes A–E are generally insulated, one from the other, so that if the tank 12 is formed from a conductive material, the operative elements of the probes are surrounded by a suitable insulator and are preferably designed so that they may be appropriately mounted into apertures formed in the side, top or bottom wall of the tank. Where the tank 12 is fabricated from a suitable insulating material, such as fiberglass reinforced plastic, the need for an insulating bushing surrounding the electrical probe may be obviated.

As will be explained in considerably more detail hereinbelow, it is known that as water to be treated is introduced into the tank through the inlet port 16, the hardness ions, generally ions of calcium and magnesium as well as others, begin replacing the sodium ions in the resin bed 14, from the inlet end top of the tank toward the outlet. As hard water is continuously introduced into the tank, the "hardness front" progresses slowly downward at a rate generally determined by the flow volume and the hardness of the water being treated. As this front moves through the bed, a substantial, measurable change occurs in the potential difference existing between selected ones of the probes A–E. By connecting a suitable high impedance electronic measuring circuit across selected probes, it is possible to accurately monitor the progress of the hardness front through the tank.

Thus, in FIG. 1 there is shown a conductor 30 which is coupled to the conductive element of the electrode or probe B with a second wire 32 being selectively connected to any one of the probes C–E. The wires 30 and 32 connect to a sensor circuit 34, the details of which will be explained in greater detail with reference to FIG. 4 of the drawings. The output of the sensor circuit 34 appears on conductor 36 and may be used to activate an audible or visual annunciator or alarm 38 and/or activate a suitable control circuit 40 for controlling the initiation or onset of the regeneration cycle for the softner in question. In this regard, the output from the control circuit 40 is shown as being coupled by a conductor 42 to the regeneration control mechanism 22.

With reference to the curves of FIGS. 2 and 3, an explanation will now be given to the underlying mode of operation of the present invention.

Figure 2:
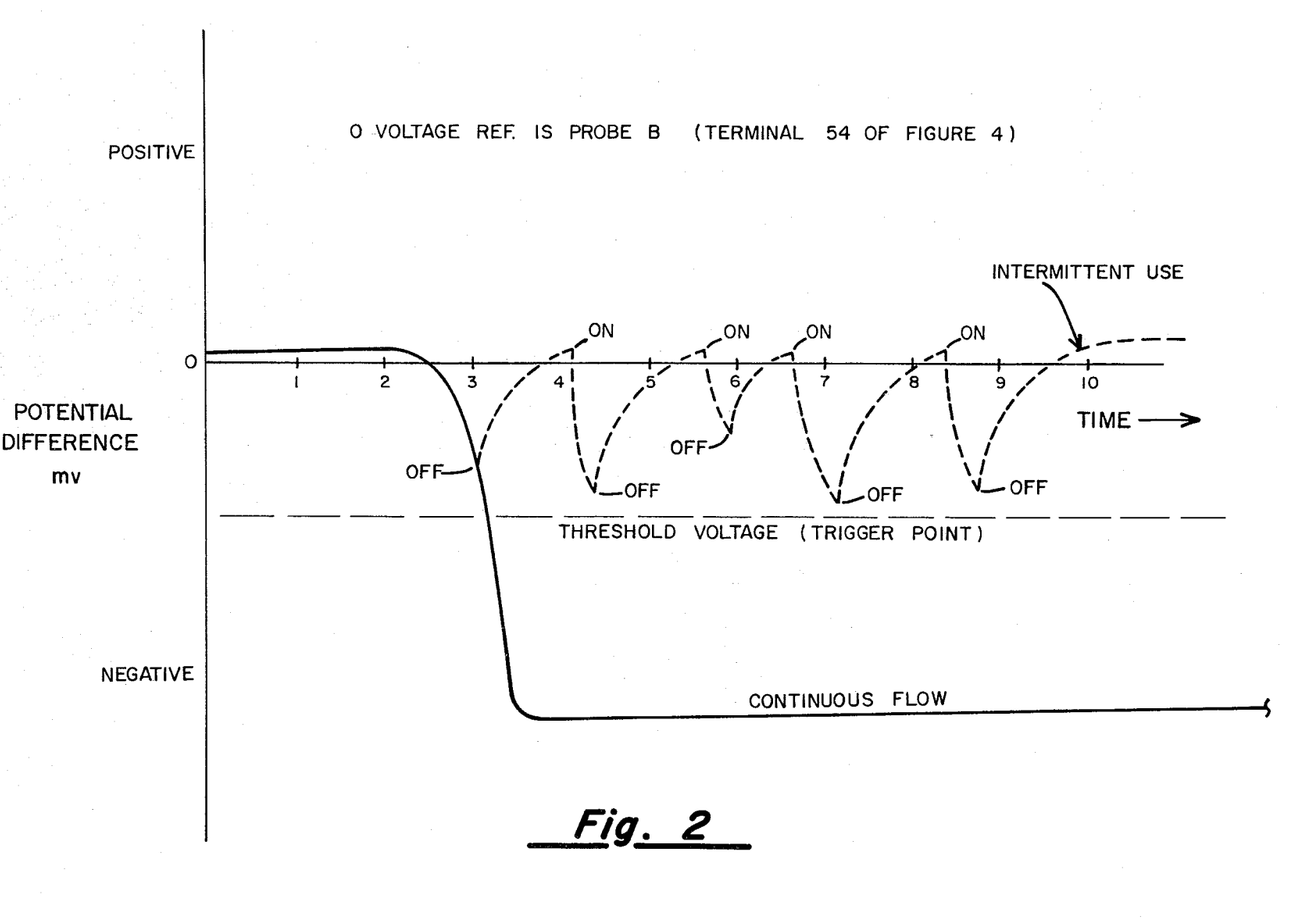
FIG. 2 illustrates a typical waveform of the potential difference developed between probes during continuous flow and intermittent flow conditions.

The solid line curve of FIG. 2 is obtained by measuring the potential difference between the reference probe B and one of the probes C, D, etc. of FIG. 1 as water of approximately 14 grains per gallon hardness is made to flow through a freshly regenerated tank at a predetermined constant volumetric rate. By observing this curve, it is to be noted that shortly following the termination of a regeneration cycle when the water supply is turned on and hard water is drawn through the resin bed, the potential difference between the reference probe B and probe D, for example, is relatively low. As time progresses, the hardness front moves downward through the tank and a substantial increase in the potential difference being monitored is noted, for example, at the point approximately three hours following turn-on. There is a substantial change in the potential difference in magnitude and possibly a change in polarity. That is, the voltage being measured may reverse in polarity and increases rather sharply in a negative direction until both probes D and B are enveloped in an exhausted resin, at which point (not shown) the potential difference being monitored decreases.

It is to be understood that the solid line curve in FIG. 2 represents the variation in potential difference with time when water is being run through the bed on a continuous, steady volume basis. The dashed line curve in FIG. 2 shows the variation in potential difference between the same two probes when water usage is on an intermittent basis. As the hardness front approaches the upper probe in the pair used for monitoring purposes, again a reversal in the polarity of the observed signal is noted. However, before the magnitude of the potential difference increases in the negative direction but not attaining a predetermined triggering threshold, the water flow has been shut off and the potential difference decreases, ultimately going positive and approaching a steady state level on an asymptotic basis. Before this steady state is reached, however, the water supply is again turned on, and the potential drops, passing through zero in a negative direction and, again, before a predetermined negative level is reached, the water supply is turned off. By comparing the solid line waveform with the dotted line waveform it can be seen that if the water supply is turned on and off frequently enough the amplitude of the negative excursion may never be sufficient to exceed the predetermined trigger point arbitrarily established for indicating the hardness condition of the water proximate the probes in question. As such, the hardness front may sneak by, so to speak, the monitoring probes.

Figure 3:
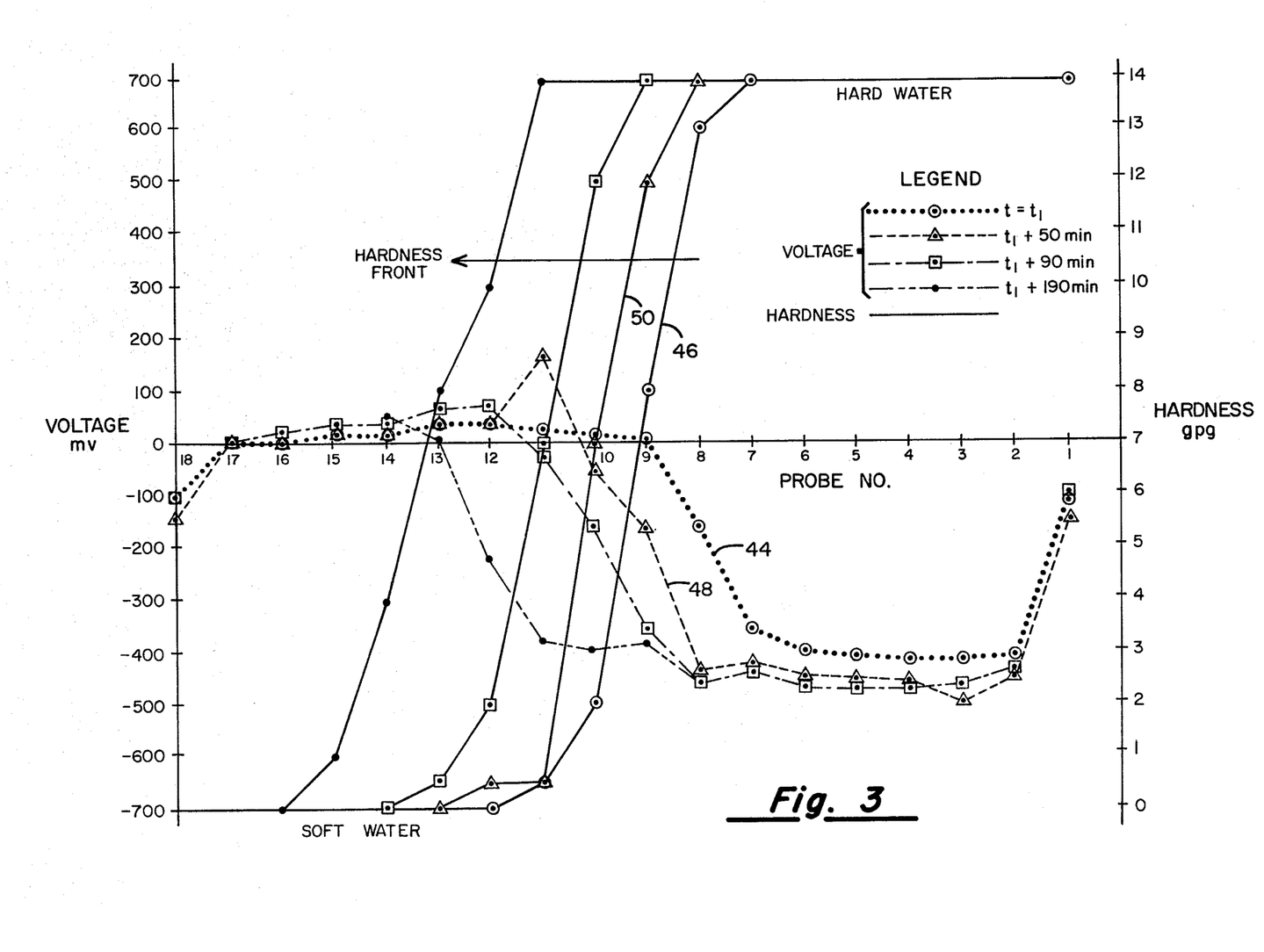
FIG. 3 is a graph illustrating the manner in which the voltage observed between probes changes as the hardness front moves through the column comprising the ion exchange resin bed.

FIG. 3 represents a set of waveforms prepared from data taken from an experimental system functioning in accordance with the teachings of the present invention, useful in illustrating the manner in which the hardness front progresses through the ion exchange resin bed when the water flow is continuous and of a constant volume rate. Also graphically displayed in FIG. 3 is the plot of the potential difference between a given probe (probe B) which is used as a reference and that existing at various other probes as a function of time. The data for the graph of FIG. 3 was obtained from a system incorporating 18 identical stainless steel probes, probe No. 1 being located proximate the upper end of the tank and probe 18 being located proximate the bottom thereof. Probe 1 was shorted to probe 18. In this arrangement, probe 17, a probe being located toward the bottom of the resin bed, was used as the reference point. It is also possible to locate the reference probe in the zone below the bottom of the resin bed, i.e., in the softened water zone. In FIG. 3, the hardness front and the voltages corresponding thereto were measured at different points in time. Specifically, at time equal to $t_1$ the voltage measured at the various probes is as indicated by the dotted line representation identified by numeral 44. At this time the hardness front was located near probe 9, as indicated by solid line curve 46. Again, with the water continuously flowing, 50 minutes later, at $t = t_1 + 50$ min., the voltage observed at the various probes was as indicated in the dashed line curve 48 and the hardness front was disposed proximate pin 10 as indicated by curve 50.

By observing the curves of FIG. 3, It can be seen that as the time passes and as water continues to flow, the hardness front propagates downward through the tank until a point is reached which is arbitrarily decided upon to be the point at which regeneration of the bed is to take place. This location is selected so that a sufficient softening capacity still remains in the tank to ensure an adequate supply of softened water until a convenient time, usually in the early morning hours, where it can conveniently take place when the occupants of the building would not normally be expected to be using water. For example, let it be assumed that regeneration is to take place at 2:00 A.M. following the time that the hardness front reaches a predetermined point in the resin bed. It is first impirically determined, based upon average water consumption and its hardness in grains per gallon, that if the hardness front reaches a predetermined point, say the location of probe C in FIG. 1, that a sufficient length of resin bed exists between that point and the bottom of the bed so that soft water will continue to be produced until 2:00 A.M. the next morning.

While the hardness front reaching a predetermined point could be used immediately to trigger a regeneration cycle, one would not normally want this to occur during a time when there is a demand for soft water. If water is being drawn at the time that regeneration is taking place, the by-pass valve will introduce hard water into the building's distribution system. It is for this reason that it is preferable in most residential and commercial systems to initiate the regeneration cycle at a predetermined time following the passage of the hardness front past a given point (probe) in the resin bed.

Now that the general construction of the apparatus comprising the preferred embodiment has been described as has the nature of the internally generated voltage when water is being used on both a continuous and intermittent basis, consideration will next be given to the electronic circuit used to sense the passage of the hardness front past a given point in the resin bed.

Figure 4:
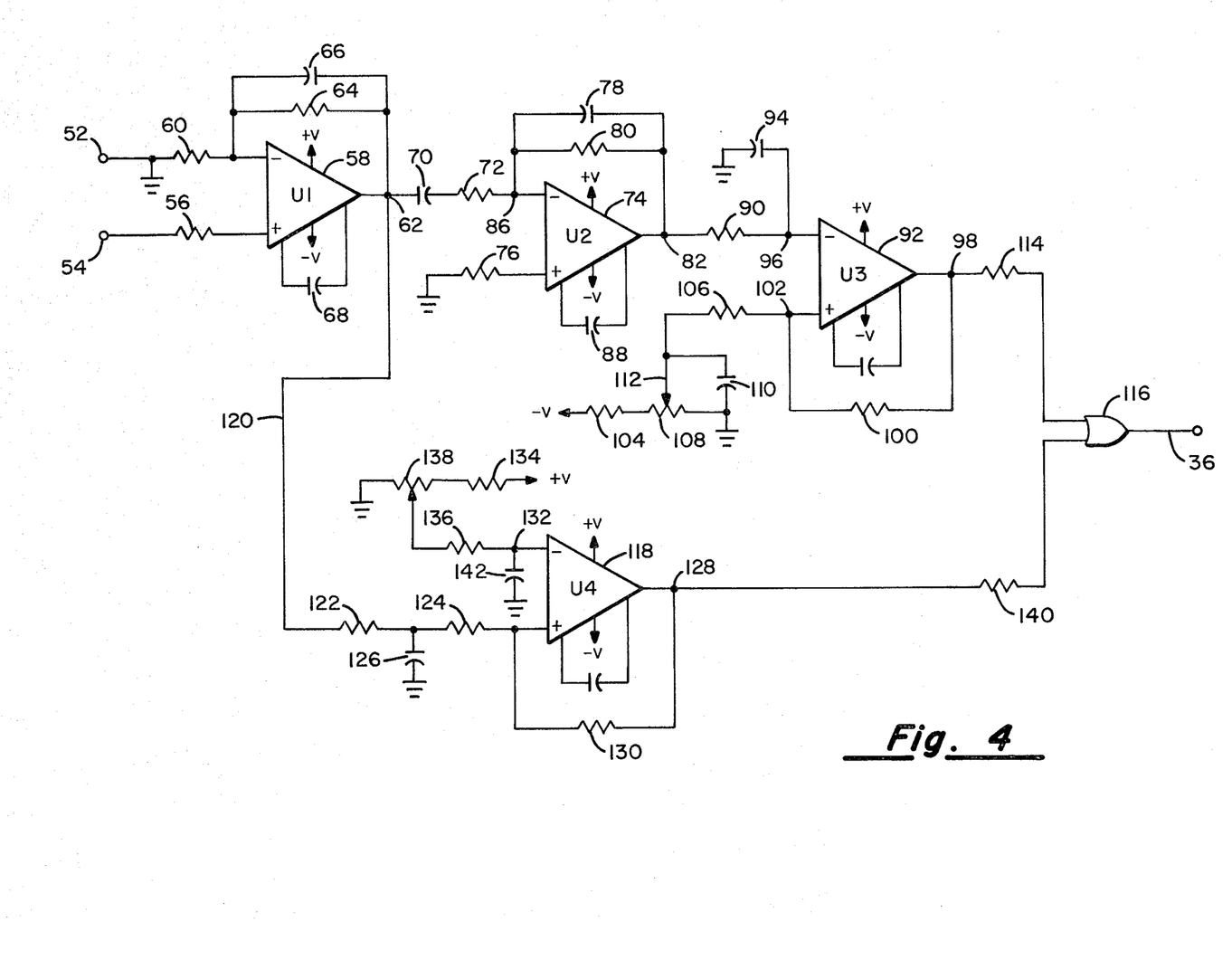
FIG. 4 is an electrical schematic diagram of a preferred embodiment of the sensor circuit illustrated in block diagram form in FIG. 1.

With reference to FIG. 4, there is illustrated a schematic of an analog implementation of the sensor circuit 34 of FIG. 1. It is to be understood, however, that the sensor circuit may be implemented using digital circuitry so that limitation to the analog approach is not intended. A first input terminal 52 and a second input terminal 54 are shown, terminal 54 being connected to a predetermined probe proximate the lower or output end of the resin column, for example, to probe B in FIG. 1. The terminal 52 is shown as being connected to a point of reference potential considered to be circuit ground while the input terminal 54, is considered to be the active input to the operational amplifier 58. A resistor 56 couples terminal 54 to the non-inverting input of an operational amplifier 58 and a resistor 60 couples the input terminal 52 of the system to the inverting input of the operational amplifier 58. The output from amplifier 58 is a voltage proportional to the difference in potential between the terminals 52 and 54. The terminal 52 may be coupled to any one of the probes C through E in FIG. 1, providing an input to amplifier 58 with respect to terminal 54 which would be connected to probe B in FIG. 1.

The output from amplifier 58 appears at a junction point 62 and a feedback network including the parallel combination of a resistor 64 and a capacitor 66 is coupled between that junction and the inverting input terminal of the amplifier 58. The operational amplifier 58 may be, for example, a RCA 3130 MOSFET OP-AMP and when such a circuit is used, it is generally desirable to connect a capacitor, such a capacitor 68 between pin terminals 1 and 8 that circuit to provide stabilization to thereby prevent high frequency oscillations or ringing at the output thereof.

The overall gain of the input OP-AMP 58 is established by the resistors 60 and 64 and when properly set, the circuit 58 may provide a gain of 10 while presenting a very high input impedance to the terminals 52 and 54. In fact, with a Type RCA 3130 OP-AMP, the input impedance may be approximately $10^{12}$ ohms which is so high as to not present an appreciable load across the input terminals 52 and 54.

The output terminal 62 is coupled through a series circuit including a capacitor 70 and a resistor 72 to the inverting input of a further operational amplifier circuit 74. The non-inverting input of this circuit is coupled through a resistor 76 to a point of fixed potential such as ground. Again, a feedback network including a capacitor 78 and a resistor 80 connected in parallel, one with the other, is connected between the output terminal 82 of the operational amplifier circuit 74 and the inverting input terminal 86 thereof. Those skilled in the art will recognize the circuit configuration of the operational amplifier 74 and its associated passive components to be an active differentiator circuit. Capacitor 70 and the feedback resistor 80 serve as the "time constant" of the differentiator. By properly selecting these values, and by the proper choice of the feedback resistor 80, the signal appearing at the output terminal 82 will be approximately equal to the time derivative of the input voltage appearing at junction 62 multiplied by the above RC time constant. The resistor 72 and the capacitor 78 are included in the circuit to provide stability, as in the capacitor 88.

The output from the differentiating circuit appearing at junction 82 is coupled through a resistor 90 to the inverting input of still a further operational amplifier 92. A capacitor 94 is connected between the inverting input terminal 96 and a point of fixed potential such as ground. The output from the amplifier 92 appears at a junction 98 and a feedback resistor 100 is coupled between that output terminal and the input terminal 102 connected to the non-inverting input of the operational amplifier 92. Connected between the input terminal 102 and a voltage source, $-V$, is a resistive voltage divider to a point of reference potential (circuit ground). The voltage divider includes fixed resistors 104 and 106 and a potentiometer or variable resistor 108. A capacitor 110 is connected between the common terminal of the resistor 106 and the wiper arm 112 of the potentiometer 108.

The operational amplifier 92 and its associated feedback resistor 100 and the input circuit to the non-inverting input thereof will be recognized as a comparator network which is operative to produce an output signal when the input signal appearing at junction 82 exceeds a predetermined threshold established by the voltage divider network, especially the setting of the potentiometer 108. In practice, the setting of the potentiometer 108 is based upon the relative hardness of the water being treated and a minumum rate of water flow which establishes the "trip point" at which the sensor circuit is to provide its output control signal. The resistor 100 when connected as shown provides a measure of hysteresis so that once the trip point is exceeded, the circuit tends to remain in its tripped condition in a fashion similar to the operation of the well-known Schmitt trigger circuit.

The output from the comparator 92 which appears at the junction 98 is coupled through a resistor 114 to a first input terminal of an OR gate 116.

Coupled generally in parallel with the differentiating circuit 74 and the comparator 92 between the junction point 62 and the OR gate 116 is a second branch including a still further operational amplifier circuit 118. More specifically, the output terminal 62 of the operational amplifier 58 is coupled by way of a conductor 120 and a series arrangement of resistors 122 and 124 to the non-inverting input terminal of the operational amplifier 118. A capacitor 126 is connected between the common point between resistors 122 and 124 to a point of fixed potential such as ground. The output from the operational amplifier 118 appears at a junction point 128. A feedback resistor 130 is connected between this junction point and the non-inverting input of the operational amplifier. Connected between the inverting input terminal 132 of this last-mentioned amplifier and a voltage source, $+V$, is a voltage divider network including fixed resistors 134 and 136 and a variable resistor in the form of a potentiometer 138. The overall function of the operational amplifier 118 and its associated components is to act as a comparator network. As such, when the signal appearing at the output terminal 62 from the input operational amplifier 58 exceeds a threshold established by the setting of the wiper arm on the potentiometer 138, the comparator circuit 118 produces a signal at its output terminal 128 which is coupled through a resistor 140 to the second input terminal of the OR gate 116. The resistor 130, like the resistor 100 associated with comparator 92, introduces a degree of hysteresis for yielding a more positive indication that the preset threshold has been exceeded by the input thereto. The purpose of the capacitor 94 associated with OP-AMP 92 and the capacitor 142 associated with the OP-AMP 118 is to filter out or eliminate 60-cycle noise which may exist when an unregulated, full-wave rectifier with modest filtering is used as the power supply for the sensing circuit.

Now that the details of the construction of the sensor circuit have been set out, consideration will next be given to its operation when acting to sense the passage of the hardness front in an ion exchange resin bed, i.e., when employed as the circuit 34 in FIG. 1.

With respect to FIGS. 1 and 4, input terminal 54 may be connected to probe B whereas input terminal 52 may be selectively connected to one of the probes C through E such that the potential difference being monitored is that existing between probe B and the probe to which the terminal 52 is coupled. As mentioned, probe B will preferably be disposed in the resin bed, but may be beneath it in the softened water outlet zone. Also it may be shorted to probe E. Let it be assumed that terminal 52 is connected to probe C and that the hardness front in the resin bed is disposed a predetermined distance above the probe C and that the water supply is continuously on and drawing hard water through the inlet pipe 16 and passing softened water through the outlet pipe 18. As time passes, the hardness front will be observed to move downward through the bed. However, so long as it remains a predetermined distance above the probe B, the potential difference being monitored may typically be in the range of from 0 to 50 millivolts or more, the value varying with flow rate and possibly other factors. Because of the high input impedance presented to the source in question, the monitoring circuit of FIG. 4 does not unduly load down the internal potential generated within the ion exchange bed and a rather steady potential will be applied to the non-inverting input of the operational amplifier 118. At this time, the signal applied to the non-inverting input will be less than the threshold established by the voltage divider network including resistors 134, 136 and 138. As such, the output appearing at the junction point 128 will be relatively low.

Again with reference to FIGS. 2 and 3, with continuous flow, as the hardness front approaches probe C there may be a marked increase in the voltage developed across the terminals 52 and 54. As the hardness front passes probe C, there is a significant negative going in potential, the voltage at terminal 52 sometimes reversing polarity and reaching a voltage typically of $-400$ millivolts or more, the absolute value being related to the flow rate at the time as well as other factors. Provided the trigger point established for the comparator 118 by the setting of the potentiometer 138 is such that when the potential difference exceeds a preset value, for example, 250 millivolts, the comparator 118 will output a relatively high signal, it is possible to sense the passage of the hardness front towards or past the probe C and to signal this event at the output of the OR gate 116.

As has already been explained above, it is possible that with intermittent water usage the hardness front could pass into the zone between probes C and B in FIG. 1 without exceeding the threshold established by the potentiometer 138 for the comparator 118 and therefore go undetected. To avoid having the hardness front move into the sensing zone without producing a signal indicative thereof, the sensing circuit of FIG. 4 includes the circuit branch including the differentiator circuit 74 and the comparator circuit 92. Because there is a marked increase in the time rate of change of the potential being measured as the hardness front approaches the zone between probes C and B when water is used intermittently, this property can be used to initiate the generation of the desired control signal when the water usage is intermittent and the absolute potential difference is insignificant to exceed the trigger point of the comparator 118. For example, with reference to the dashed line curve of FIG. 2, it can be seen that prior to the time that the hardness front moves into a zone close to probe C, the turning on and off of the water supply does not produce a significant change in the magnitude of the voltage being measured between probe C and the reference probe, probe B. However, as the hardness front approaches probe C, the on and off cycling of the water supply results in rather substantial changes or swings in the voltage being measured. The rate of change of this voltage may be positive in the interval where the water supply is turned off and negative in the interval where the water supply is again turned on. Hence, by sensing the positive rate of change or the negative rate of change with suitable sensing circuitry, one may discern the onset of water hardness approximate a probe even though the absolute value of the voltage change being measured does not exceed a predetermined threshold or trip point.

The differentiating circuit 74 monitors the output voltage appearing at junction 62. The voltage generated at the output terminal 82 of circuit 74 is directly proportional to the time rate of change of that input signal. Thus when the rate of change of the signal appearing at junction 62 reaches a value indicative of the onset of the hardness front, this event may be signaled by comparing the voltage at the terminal 82 with a preset threshold. This, of course, is the function of the comparator network 92. Thus, even though the absolute amplitude of the potential difference between the monitoring probes is insufficient to exceed the threshold for the steady-state monitoring comparator 118, the output from the comparator 92 may be used to indicate the fact that the hardness front is located in the zone between probes C and B. Thus, OR gate 116 will produce an output signal when either of these two events occur. That is, if water is being drawn relatively continuously through the softener bed, the comparator 118 will output a signal to the OR gate 116. However, when the water is being used on an intermittent basis, the time rate of change of the potential difference between probes is monitored by the differentiating circuit 74 and when the rate of change is sufficiently high, comparator 92 will output a signal to the OR gate 116.

Figure 5:
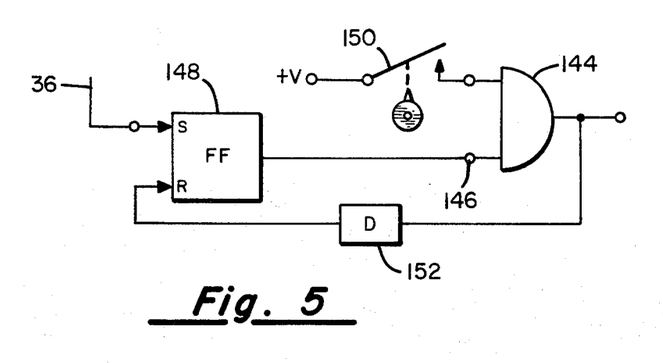
FIG. 5 is a schematic diagram of a circuit responsive to the output from the sensor circuit of FIG. 4.

Just what is done with the signal emanating from the gate 116 is somewhat a matter of choice. For example, it may be used to sound an audible alarm or activate a visual display as signified by block 38 in FIG. 1. The signal may also be applied to a further control circuit 40 which will cause the regeneration cycle to be initiated at a particular hour subsequent to the generation of the output signal from the sensor circuit. One possible implementation of the control circuit 40 is illustrated in FIG. 5 of the drawings. Here, there is provided a coincidence gate 144 having a first input 146 coupled to the output of a non-volatile set-reset flip-flop 148. The set terminal of the flip-flop 148 is connected to the output line 36 of the sensor circuit of FIG. 4 such that upon the occurrence of said output signal, the flip-flop 148 will be switched to its set state, thereby partially enabling the gate 144. Being non-volatile, the state of the flip-flop 148 remains unchanged even following an interruption of the electrical supply. The second input to the gate 144 is coupled through a timer operated switch 150 to a source of positive potential. The timer operated switch may be a solid state digital timer or may comprise an electromechanical clock mechanism which will cause the contacts of the switch to close at a predetermined time each 24-hour interval. Thus, for example, the contacts of the switch 150 can be made to close at, say, 2:00 A.M. each day and in doing so, will cause the gate 144 to output a regeneration cycle triggering signal only if the flip-flop 148 had been set during that 24-hour interval following the preceding closure of the switch contacts 150. The output signal from the gate 144 is fed back through a delay element 152 to the reset input terminal of the flip-flop 148, the arrangement being such that upon completion of the regeneration cycle the system of FIG. 5 will be conditioned to await the receipt of a subsequent signal from the sensor network 34.

It is thus apparent that there is provided an apparatus and method which achieves the various objects and advantages of the invention. Because various possible embodiments might be made of the above invention, and as various changes might be made in the embodiment set forth, it is to be understood that the arrangements disclosed are illustrative only. For example, rather than using the output signal from the sensor network 34 to initiate a regeneration cycle at a later predetermined time, the same signal can be used to control an electromechanical valve to switch over from a first softener system to a second redundantly provided system, thereby ensuring a continuous source of treated water. That is to say, in industrial or large commercial installations, plural water softener systems may be connected in parallel for alternately supplying the building's needs for soft water. When one such system is being utilized to provide the requirements for soft water, the other may be undergoing regeneration and vice versa.

As stated, because of the various alternatives and arrangements which will become apparent to those skilled in the art from the reading of the accompanying specification and drawings, the scope of the invention is to be determined strictly from the following claims.

What is claimed is:

1. In water softening apparatus of the type including an elongated tank containing an ion exchange resin bed, a method for initiating regeneration of said bed when the hardness front reaches a predetermined location within said bed comprising the steps of:
    (a) continuously measuring the self-generated electrical potential difference between predetermined spaced apart non-dissimilar metal electrodes in said bed as water is made to flow through said bed;
    (b) sensing when a change of self-generated potential difference being measured exceeds a predetermined threshold and producing a first output signal indicative thereof;
    (c) sensing when the rate of change with respect to time of said potential difference being measured exceeds a predetermined value and producing a second output signal indicative thereof; and
    (d) logically combining said first and second output control signals and using said resultant signal to initiate a regeneration control apparatus.

2. Apparatus for initiating the regeneration cycle control means in water softening apparatus of the type in which the water to be treated is passed from a water inlet through an elongated tank containing a column of ion exchange resin material to a water outlet, comprising, in combination:
    (a) at least two electrode elements formed from non-dissimilar metals mounted in said tank at first and second longitudinally spaced locations proximate the end of said tank remote from said water inlet, at least one of said electrode elements being disposed in said column of ion exchange resin material;
    (b) sensing means connected to said two electrode elements for sensing the change in self-generated electrical potential between said probes as water being treated is made to flow through said column and for producing a first control signal when said electrical potential exceeds a predetermined value indicative that the hardness front in said column is located between said two probes;
    (c) rate of change detecting means coupled to said sensing means for producing a second control signal when the rate of change with respect to time of said potential between said two electrode elements exceeds a predetermined value; and
    (d) controlled means responsive to said first and second control signals for subsequently operating said regeneration means.

3. Apparatus as in claim 2 wherein said sensing means comprises:
    (a) a first operational amplifier having first and second inputs and an output, said first and second inputs being coupled individually to said electrode elements for amplifying said potential difference between said two elements while presenting a high impedance therebetween; and
    (b) a second operational amplifier having a pair of inputs and an output, one of said inputs being coupled to said output of said first operational amplifier and the other of said pair of inputs being coupled to a source of reference voltage, said second operational amplifier producing an output signal when the voltage applied to said one of said pair of inputs exceeds that applied to said other of said pair of inputs.

4. Apparatus as in claim 3 wherein said rate of change detecting means comprises:
    (a) a differentiating circuit having an input and an output, said input being coupled to said output of said first operational amplifier;
    (b) comparator means having a pair of inputs and an output, one of said inputs of said comparator means being connected to said output of said differentiating circuit and said other input of said comparator means being coupled to said source of reference voltage.

5. Apparatus as in claim 2 wherein said controlled means comprises:
    (a) an OR gate having a pair of inputs and an output, one of said inputs of said OR gate being coupled to receive the output signal from said sensing means and the other input of said OR gate being coupled to the output of said rate of change detecting means.

6. Apparatus as in claim 5 wherein said controlled means further includes:
    (a) non-volatile signal storage means coupled to the output of said OR gate; and
    (b) means responsive to a signal stored in said storage means for activating said regeneration means at a predetermined time subsequent to the entry of a signal into said non-volatile signal storage means.

7. Apparatus as in claim 6 wherein said last-mentioned means comprises:
    (a) sampling means connected to read out the contents of said non-volatile storage means at a predetermined time each twenty-four hour period; and
    (b) means responsive to the state of said sampling means for initiating the operation of said regeneration cycle control means.

8. Apparatus as in claim 5 wherein said controlled means further includes:
    (a) at least one electromechanical valve means connected for control to the output of said OR gate.

* * * * *

UNITED STATES PATENT AND TRADEMARK OFFICE
CERTIFICATE OF CORRECTION

PATENT NO. : 4,320,010
DATED : March 16, 1982
INVENTOR(S) : Mario A. Tucci and George K. Sutherland It is certified that error appears in the above-identified patent and that said Letters Patent are hereby corrected as shown below:

Column 14, Line 19, after the word "said" insert -- two --. Line 24, after the word "said" insert -- pair of --.

*Signed and Sealed this*

*Twenty-fifth* Day of *May 1982*

[SEAL]

*Attest:*

*Attesting Officer*

GERALD J. MOSSINGHOFF

*Commissioner of Patents and Trademarks*